Oct. 1, 1968 L. OSBORN 3,403,914

RECORD ADAPTER SPINDLE

Filed March 4, 1966 3 Sheets-Sheet 1

Inventor:
Lloyd Osborn
By Brown, Jackson, Boettcher & Dienner
Attys

Inventor:
Lloyd Osborn,
By Brown, Jackson, Boettcher & Dienner
Attys

Oct. 1, 1968 L. OSBORN 3,403,914

RECORD ADAPTER SPINDLE

Filed March 4, 1966 3 Sheets-Sheet 3

Inventor:
Lloyd Osborn,
By Brown, Jackson, Boettcher & Dienner
Attys

United States Patent Office 3,403,914

Patented Oct. 1, 1968

3,403,914

RECORD ADAPTER SPINDLE

Lloyd Osborn, Stevensville, Mich., assignor to V-M Corporation, Benton Harbor, Mich., a corporation of Michigan Filed Mar. 4, 1966, Ser. No. 531,829
14 Claims. (Cl. 274—10)

ABSTRACT OF THE DISCLOSURE

A record adapter spindle for mounting over and operation by a record changer center spindle of the type having a plurality of record lowering fingers which normally extend outwardly through slots formed in the spindle body and which move downwardly to lower a record to the turntable and are retracted inwardly to release the record and having at the upper end a plurality of extendable fingers that support a remaining stack of records during lowering. The adapter includes a cam to move the lowering fingers out of the way when the adapter is placed about or removed from the center spindle and includes records lowering pawls extending through slots in the adapter body for lowering a large center hole record and record supporting fingers which are extendable through the slots to support a remaining stack of records. The pawls and adapter supporting fingers operate in response to movement of the center spindle lowering fingers and extendable fingers respectively.

The present invention relates to an adapter spindle for record changers and, more specifically, to a large diameter adapter spindle designed to slip over a conventional small diameter center spindle of a record changer to permit the handling of 45 r.p.m. records, for example, which have a center hole diameter of about 1.5 inches, as opposed to 33 r.p.m. records which have a center hole diameter of about 0.30 inch.

A feature of the present invention is that an improved adapter spindle is provided on which a supply of records may be disposed at an upper storage portion and controllably lowered, one at a time, to a turntable for playing, using the mechanism of the small center spindle which is provided for lowering records having a small diameter center hole, for example, 33 r.p.m. and 78 r.p.m. records.

Some known spindle adapters which hold a stack of 45 r.p.m. records supply said records, one at a time, to an associated turntable by simply dropping the lowest record of the stack of records to a turntable during a record changing cycle. Such dropping causes the record to strike the turntable or the records positioned on the turntable with the forces gained during dropping thereof. This uncontrolled dropping also produces undesirable noise during record changing. Often the falling record does not fall in a plane which is parallel to the record positioned on the turntable, but strikes the top record thereof at some angle and thereby damages a portion of it. To eliminate these disadvantages, controlled record lowering is desirable.

The present invention however provides a record adapter spindle of the "self-supporting" type whereby a stack of 45 r.p.m. records to be played is supported at an upper storage portion on the adapter spindle without the need for an overlying support arm or the like in order to stabilize the records. The adapter spindle provides controlled lowering of the lowermost or bottom record of the supported records from the upper storage portion, while holding the remaining records at the storage portion while the bottom record is being lowered. The improved record adapter spindle sets over and rests upon a self-supporting, small diameter, controlled-lowering, center spindle for records of a relatively smaller center hole.

This center spindle is operatively associated with the novel adapter spindle so that the mechanism of the small diameter spindle controls the operating mechanism of the adapter spindle as hereinafter described.

More particularly, the record adapter spindle of the present invention includes record support fingers which may project outwardly through slots in the body of the adapter spindle in order to support the stack of records at the upper storage portion of the spindle. Those record support fingers are actuated by the center spindle. Also, a plurality of record lowering pawls normally project outwardly below the record support fingers through slots in the adapter spindle body and are movable downwardly to lower the lowermost record in the stack toward the turntable for playing. The record lowering pawls are raised and lowered by primary record supporting fingers of the small diameter center spindle. The record lowering pawls lower the bottom record in the stack in a controlled manner approximately to the turntable before releasing the record. A guide roller associated with the adapter spindle rests on the turntable and is free to rotate therewith, guided only by the center spindle. The records which are lowered to the turntable are positioned concentrically about the guide roller.

It is therefore an object of the present invention to provide for a record changer mechanism an improved record adapter spindle for 45 r.p.m. records, which spindle supports the records by itself and without stabilizing arms and the like.

A further object of the present invention is to provide for use with a small diameter center spindle of a record changer a record adapter spindle which supports the records by itself and has a controlled record lowering mechanism.

Another object of the invention is to provide a record adapter spindle having record support fingers which support a stack of records at an upper storage portion thereof while permitting record lowering pawls to lower the bottom record of the stack substantially the entire distance from the upper storage portion to the turntable.

An additional object of the present invention is to provide a bearingless adapter spindle.

Another object is to provide an adapter spindle which is easily associated with, and disassociated from, a small diameter center spindle, the operating mechanism of which latter spindle includes laterally projecting means for supporting records having small diameter center holes.

Yet another object of the present invention is to provide a record adapter spindle having operating parts formed of stamped parts which are simple in construction and readily mass produced at low unit cost.

Other and further objects, features and advantages will be apparent from the following description of a presently preferred embodiment of the invention, when taken in conjunction with the accompanying drawings in which like reference numbers designate like parts throughout the several views and where:

Figures 4, 5, 6:
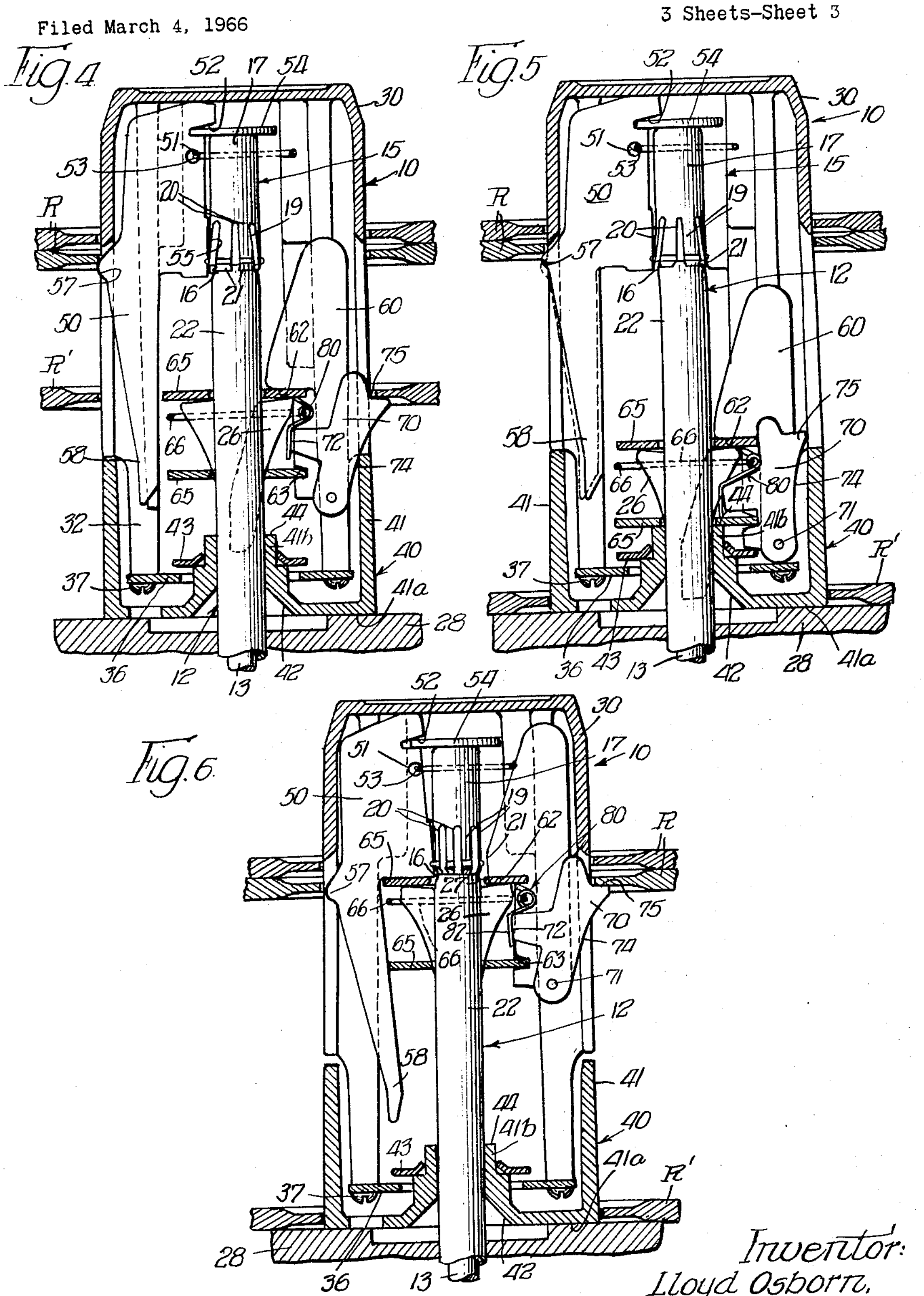
FIGURE 4 is a vertical sectional view showing a record in a partially lowered position and showing the relative positions of the record support fingers when supporting a stack of records and the record lowering pawls when lowering a record.

FIGURE 5 is a vertical sectional view showing a record lowering position at which the record lowering pawls are cammed into the guide roller; and FIGURE 6 is a vertical sectional view illustrating the record support fingers in their most retracted position within the adapter spindle body and the record lowering pawls in their uppermost position engaging the lowermost record of the stack at the upper storage portion of the spindle.

Figure 3:
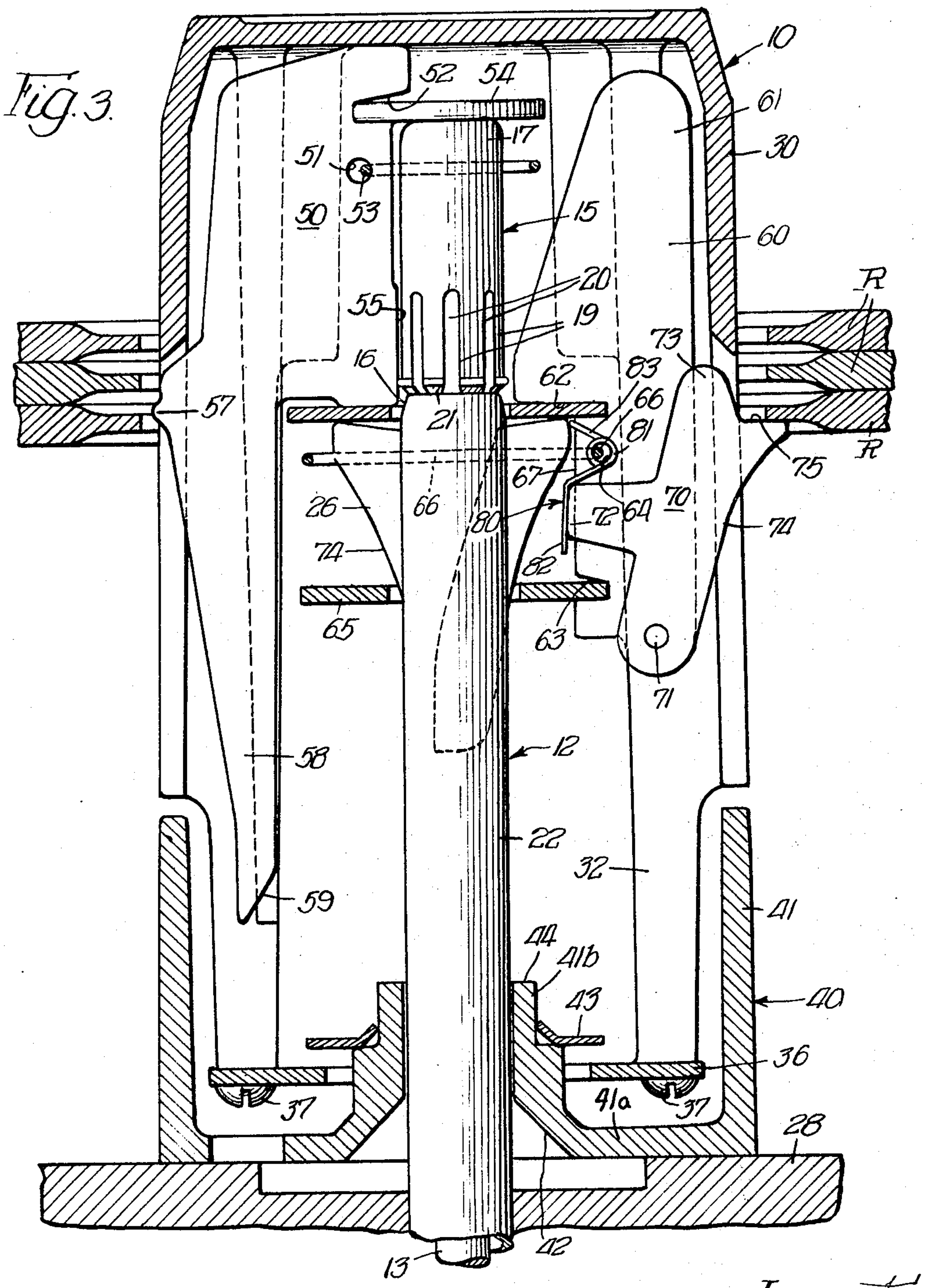
FIGURE 3 is a vertical sectional view taken substantially along the lines 3—3 of FIGURE 2 and showing the relative position of the record support fingers, and of the hangers and associated record lowering pawls, in a record supporting position, and showing a small diameter record changer center spindle for supporting and operating the adapter spindle.

Referring now to the drawings and particularly to FIGURE 3, there is shown a record adapter spindle 10 of the present invention associated with a record changer, small diameter, center spindle such as is shown and described in the copending application of Gerald H. Freier, Ser. No. 453,164, filed May 4, 1965, and is here incorporated by reference. That application is owned by the assignee of the present application.

The record changer center spindle 12 comprises a spindle body 22 having a plurality of circumferentially spaced vertical slots formed therein through which a corresponding number of primary record supporting fingers 26 project. In the embodiment described the fingers 26 are pivotally articulated to a vertically slidable rod portion 13 operatively associated with the record changer structure as described in said copending application. The center spindle 12 is disposed concentrically with respect to a turntable 28. A secondary record supporting means 15 of center spindle 12 comprises a cap 17 having a plurality of downwardly extending fingers 19 defined by a plurality of narrow vertical slots 20 formed in the cap 17. Each of the depending fingers 19 has a rib 21 formed on the outer surface thereof. Cap 17 is vertically movable between an upper, inoperative position (shown for example in FIGURE 6) wherein the fingers 19 are retracted and the ribs 21 thereon are positioned relatively inwardly from the centers of the records, and a lower, operative position shown for example in FIGURES 4 and 5 wherein the fingers 19 are expanded radially outwardly. Cap 17 is biased downwardly by spring means (not shown) and it is moved upwardly by an upwardly extending rod operatively associated with rod portion 13. When cap 17 moves downwardly relative to spindle body 22 the fingers 19 are cammed outwardly by the tapered portion 16 on spindle body 22 which causes ribs 21 to engage the lowermost of a stack of supported small hole records, as is disclosed in greater detail in said copending application Ser. No. 453,164, of Freier.

In the small diameter center spindle of said copending application of G. H. Freier, when a record having a small diameter center hole is lowered to the turntable 28 during a record change cycle, the primary fingers 26 are disposed outwardly of vertical slots formed in the spindle body 22. The primary fingers 26 are of sufficient width across their upper supporting surfaces 27 so that when fully extended as shown in FIGURES 3 and 6, their respective supporting surfaces combine to provide a solid supporting shelf which reaches outwardly from the spindle body 22 to support the lower surface of the record to be lowered. As the primary fingers 26 are lowered during a record changing cycle, the downwardly extending fingers 19 of the cap 17 expand radially outwardly and thereby support the remaining records of the stack. The primary fingers 26 are cammed inwardly to a retracted position in the spindle body 22 as the plane defined by the upper supporting surfaces 27 is lowered substantially the entire distance to the turntable. At the lower end of the stroke the fingers are cammed into the spindle body 22 so as to assume a retracted position. Subsequently, the fingers 26 will again be moved upwardly and expanded outwardly through their respective slots to engage said next record for controlled lowering to the turntable 28. It is believed that the above description of the record changer center spindle 12 is sufficient for an understanding of the present invention. Further detailed information regarding it may be obtained by reference to said copending application of G. H. Freier, Ser. No. 453,164 and to the copending application of Robert J. Hammond, Ser. No. 449,533, filed Apr. 20, 1965, owned by the assignee of the present application. It should be understood that the secondary record supporting means 15 and the primary fingers 26 are described herein merely by way of example, and other means may be utilized for operating and supporting the record adapter spindle 10 of the present invention.

Figure 1:
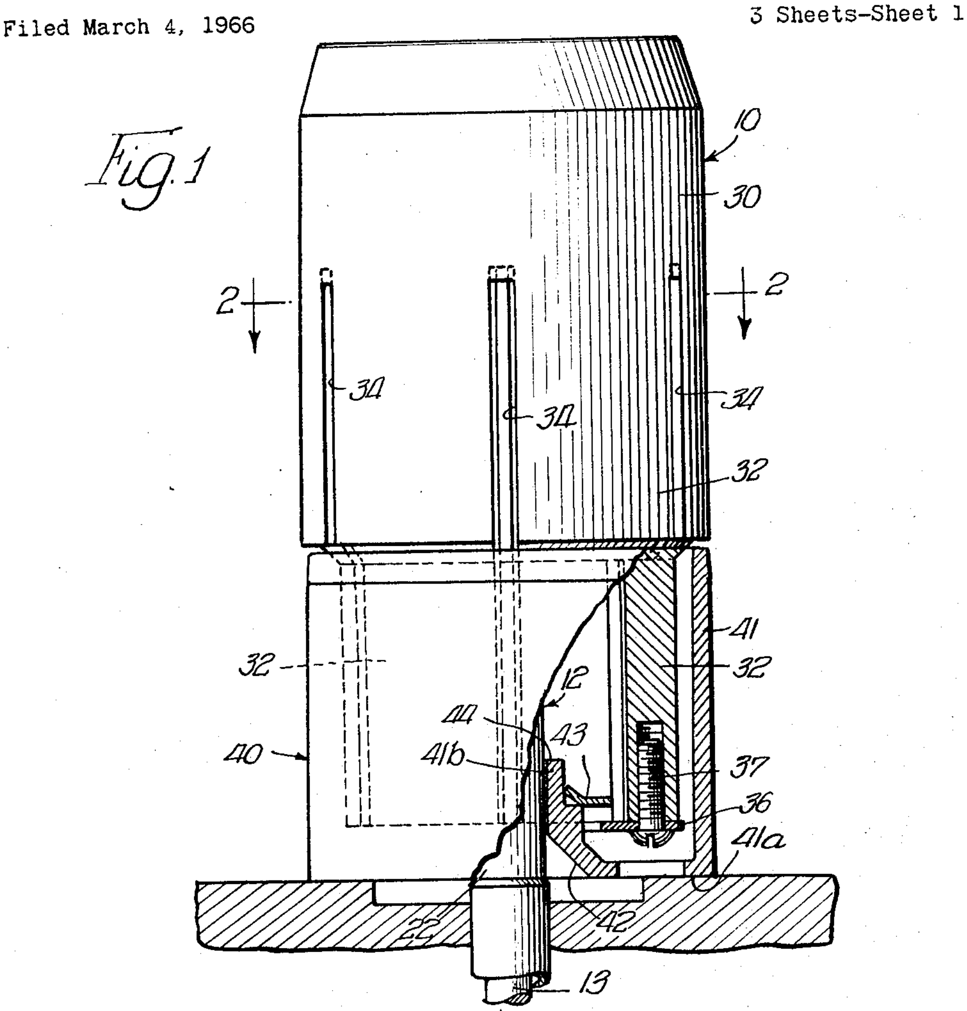
FIGURE 1 is an elevational view, partly in section and partly broken away, of a "self-supporting" record adapter spindle constructed in accordance with the present invention, showing a spindle body having a plurality of spaced vertical slots and a guide roller rotatably and operatively connected to the spindle body.
Figure 2:
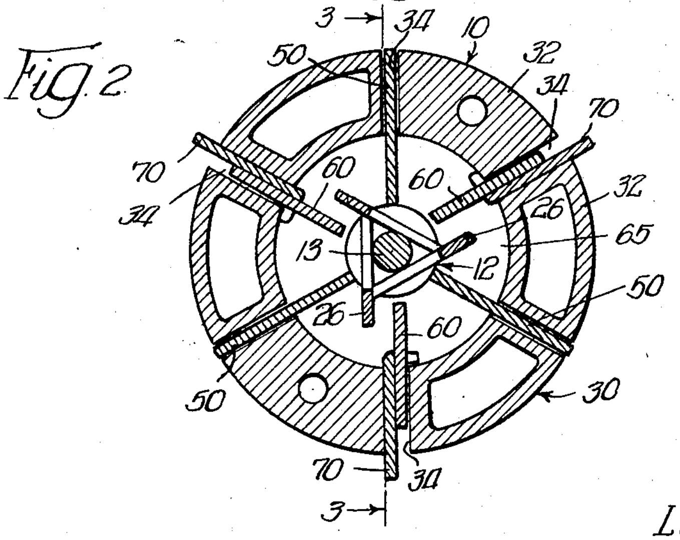
FIGURE 2 is a horizontal sectional view taken substantially along the line 2—2 of FIGURE 1 showing a plurality of record support fingers, and a plurality of hangers and associated record lowering pawls disposed within the spaced vertical slots in the adapter spindle body.

As seen in FIGURES 1, 2 and 3 the record adapter spindle 10 of the present invention comprises an adapter spindle body 30 having an outside diameter suitable for mounting a plurality of 45 r.p.m. records thereabout. The adapter spindle body 30 has a plurality of downwardly extending legs 32 defined by a plurality of narrow vertical slots 34 formed in the adapter spindle body 30. The vertical slots 34 extend for substantially the entire length of the adapter body 30 and, as shown in FIGURE 2, three of them are of a width to guide and provide lateral support to record support fingers 50, and an alternate set of three slots are of a width to guide and provide lateral support to hangers 60 and attached record lowering pawls 70. The adapter spindle body 30 is formed having a central passageway of sufficient diameter for receiving the center spindle 12 and a plurality of annular spaced washers 65 which are associated with the hangers 60.

As shown in FIGURE 1, an annular lower retainer 36 is mounted, as by fasteners 37, to the lower surface of the downwardly extending legs 32. A guide roller 40 is rotatably mounted to the adapter spindle body 30 and has an upstanding peripheral wall 41 surrounding the lower portion of the adapter spindle body 30 and an outside diameter adapted to concentrically position 45 r.p.m. records thereabout for playing on the turntable. The height of wall 41 exceeds the height of the stack of records which will be played on the turntable.

The guide roller 40 has integrally formed in its base **41*a* a central cone portion 42 and a central bearing portion or guide 41*b*. The cone portion 42 is adapted to radially inwardly displace the primary record supporting fingers 26 to a position within the center spindle 12 when positioning the adapter 10 on the center spindle 12. When the adapter 10 is disposed over the center spindle 12, guide roller 40 rests on the turntable 28 and is free to rotate with its central guide portion 41*b* fitting about and guided by the center spindle body 22. The roller 42 maintains records in a concentric relationship with the center spindle and turntable as they are played. An annular retainer 43 is fixedly mounted on the exterior of the guide portion 41*b* of the guide roller 40, and the retainer's outside diameter is relatively larger than the inside diameter of the annular lower retainer 36. In this way, when the adapter spindle body 30 is moved relatively upward, a portion of the upper surface of the lower retainer 36 engages a portion of the lower surface of the bearing retainer 43 and thereby raises the guide roller 40 to which the bearing retainer 43 is securely attached. Such engagement keeps the guide roller and spindle body relatively connected at times when the spindle 10 is not assembled to the record changer. When the record adapter spindle 10 is mounted about the small diameter record changer spindle 12, the annular retainer 43 and the annular lower retainer 36 are in a spaced apart relationship and the guide roller 40 is free to rotate as the turntable 28** rotates.

As best seen in FIGURE 2, the adapter spindle body 30 is preferably provided with six equally spaced vertical slots 34. The record support fingers 50 and the hangers 60 and associated record lowering pawls 70 are preferably positioned in alternate slots around the body. Thus in a preferred embodiment there are three each, of the record support fingers 50, and three each of the hangers and record lowering pawls 60 and 70.

Each record support finger 50 is positioned in its respective slot 34 in a plane which extends generally radially of the longitudinal axis of the adapter spindle body 30. As may be seen in FIGURE 3 each record support finger 50 has a notch 52 formed therein for receiving the margin of a finger support plate or washer 54, and the three support fingers 50 mount concentrically thereabout and are supported thereby. Each record support finger 50 has an aperture 51 formed therein for receiving a finger retainer spring 53 which spring urges the record support fingers 50 radially inwardly, pivoting them about the margin of the finger support washer or plate 54. Each record support finger 50 further includes a radially inwardly extending shoulder 55, and an outwardly extending protrusion or nib 57. The outwardly extending nibs 57, when operated as hereinafter described, extend outwardly from the adapter spindle body 30 to support a stack of records R. The nibs 57 of the several fingers 50 cooperate to define a plane for engaging a portion of the lower surface of the lowermost record of the stack of records R which is to be supported while another record is being lowered to the turntable. Each record support finger 50 further includes a leg portion 58 which is long enough to extend into the interior of the roller 40. The sidewall 41 of the roller restrains the leg portions 58 against too much radially outward movement.

Each hanger 60 includes a head portion 61 and has an upper notch 62, a lower notch 63 and an aperture 64 formed therein. The notches 62 and 63 are adapted to mount on a pair of axially spaced and concentrically aligned annular washers 65. The three hangers 60 are preferably maintained concentric to the axis of the adapter spindle and are positioned equidistantly about the washers 65 and are biased radially inwardly against said washers by a spring 66 mounted through the respective apertures 64 of each hanger 60.

Each record lowering pawl 70 is pivotally attached to one of the hangers 60 by a shoulder rivet or other fastener 71 mounted through aligned holes suitably formed in each hanger 60 and record lowering pawl 70. A hook portion 72 formed on each pawl 70 abuts and engages behind a shoulder portion 67 of the hanger 60. The shoulder portion 67 is formed between the upper notch 62 and the lower notch 63 of each hanger 60. The hook 72 limits the radial outward movement of the record lowering pawl 70 by the hook 72 engaging the shoulder portion 67. Each record lowering pawl further includes an ear 73, a cam portion 74, and a record supporting shoulder 75. The supporting shoulder 75 of the respective pawls 70 are adapted to extend outwardly from the slots 34 of the adapter spindle body 30 and cooperate to define a plane. In this way they provide a solid supporting shelf to support the lower surface of a record to be lowered to the turntable. The pawls are adapted to lower the same, as hereinafter described, with a controlled vertical movement and to deposit the record on the turntable 28 or on the uppermost record on the turntable. The deposited record is disposed concentrically about the guide roller 40.

Each pawl 70 is biased outwardly by a spring 80 having a coil portion 81, a leg 82, and an arm 83 having a crooked, or U-shaped, end. In the preferred embodiment there are three springs 80, one each for each of the hanger-pawl assemblies. The spring 66, which is mounted through apertures 64 in the hangers 60, extends through the coil portions 81 of each spring 80. The crooked end of each arm 83 engages the shoulder portion 67 of hanger 60 and the leg 82 of spring 80 abuts the hook 72. Each spring 80 is adapted to bias its respective pawl 70 radially outwardly of the adapter body 30 about the rivet 71 as a pivot.

In order to lower a record to the turntable 28 for playing, it is necessary to lower the record lowering pawls in a controlled manner. This operation is accomplished by the controlled lowering of the primary fingers 26 of the record changer center spindle 12. When the primary fingers 26 are lowered, cap 17 is urged downwardly and the fingers 19 extending downwardly from cap 17 of the secondary means 15 expand radially outwardly as they engage the tapered portion 16 of spindle body 22. The primary fingers 26 are lowered in a controlled manner substantially the entire distance to the turntable 28. It will be understood that the secondary means 15 and the primary fingers 26 are operatively associated with the record adapter spindle 10 of the present invention in a manner hereinafter described.

As shown in FIGURE 3, the center spindle 12 extends upwardly axially through the adapter spindle body 30. The adapter spindle body 30 is supported by the finger support plate 54 resting on the cap 17 with the upper portions of the record support fingers 50, which are associated with said plate 54, abutting the under side of the top portion of body 30. The spindle 12 also passes through the aligned central apertures in the spaced apart washers 65. In the position shown in FIGURE 3, the primary fingers 26 extend outwardly from the spindle body 22 of center spindle 12 and the downwardly extending fingers 19 of cap 17 are in a normal relaxed position. The upper supporting surfaces 27 of the primary fingers 26 abut the lower surface of the upper washer 65 which is positioned within the upper notches of the hangers 60.

As the primary fingers 26 descend vertically in a controlled manner, the assembly (including the washers 65, hangers 60 and pawls 70) which is supported on the upper surfaces 27 of fingers 26, is lowered in a controlled manner. The hanger-pawl assemblies are each positioned in their respective slots 34 in a plane which extends radially of the longitudinal axis of the adapter spindle body 30. Each of the hangers 60 is longitudinally movable along its corresponding slot between the raised position of FIGURE 3 and a lowered position within the adapter spindle body. The hangers 60 are guided in their movement by the side walls of the slots 34 in adapter body 30.

The pawls 70 which are attached pivotally at 71 to the hangers 60 are each positioned in a plane which is parallel to the plane of the hanger to which it is attached. Each pawl 70 is movable in its corresponding plane between an extended position (see FIG. 3), where the shoulder portion 75 thereof projects outwardly from the adapter spindle body 30 through its corresponding slot 34, and a retracted position (see FIG. 6) where the shoulder is contained within the adapter spindle body. In the fully lowered position the lower portions of pawls 70 lie within the guide roller 40. Each finger 50 is movable in its corresponding plane between an extended position wherein the nib 57 thereof projects outwardly of the adapter spindle body 30 through its corresponding slot 34 and a retracted position wherein it is substantially completely disposed within the adapter spindle body 30.

In FIGURE 3, the primary fingers 26 are about to begin their downward movement. The supporting shoulders 75 on the record lowering pawls 70 extend outwardly from their corresponding slots 34, being biased outwardly by the springs 80, and support the stack of records R. The hook 72 of each pawl 70 abutting the shoulder portion 67 of its hanger 60 limits the radially outwardly pivotal movement of the pawl 70. Cap 17 begins to descend and therefore its downwardly extending fingers 19 of the secondary means 15 ride on the tapered surface 16 of the center spindle's body 22 and begin to expand radially outwardly so that the ribs 21 attached thereto engage the shoulders 55 of the record support fingers 50 and move the record support fingers 50 radially outwardly against the bias of the finger retaining spring 53 and about the pivot points in notches 52 of the fingers 50. The outwardly extending nibs 57 of fingers 50 are moved outwardly from the adapter spindle body 30 through their corresponding slots 34 and into engagement with the under surface of the next lowermost record. In such position the nibs 57 of fingers 50 will support the weight of the entire stack of records R except the lowermost which rests on the shoulders 75 of pawls 70 which are to lower the lowermost record toward the turntable 28.

In FIGURE 4 the primary fingers 26 of the center spindle 12 have descended a part of the way to the turntable 28 and have lowered the record-lowering assembly, comprising the hanger-pawl assemblies, and a record R'. The downwardly extending fingers 19 of cap 17 of center spindle 12 and their ribs 21 have been fully extended outwardly and the ribs 21 have engaged the shoulders 55, thereby radially pivoting the record support fingers 50 and their nibs 57 outwardly from the body 30, whereby the nibs 57 have engaged the lower surface of the "new" bottom record and support the stack of records R.

The supporting shoulders 75 of the record lowering pawls 70 support the record R' and lower it in a controlled manner downwardly toward the turntable 28 under the controlled guidance of the primary fingers 26 which operatively support the washer 65 positioned in the upper notches 62 of the hangers 60. The weight of the record-lowering assembly and the record R' is sufficient to move the assembly and the record R' downwardly with the primary fingers 26 providing controlled support and controlled descent. When the cam portions 74 of the record lowering pawls 70 engage the upstanding peripheral wall 41 of roller 40, the supporting shoulders 75 of pawls 70 are cammed radially into their respective slots 34 in body 30, thereby allowing the record to drop under its own weight the small remaining distance to the turntable, or to the uppermost record of a group which might already be on the turntable.

In FIGURE 5 the record R' is shown disposed concentrically about the guide roller 40 and positioned on the turntable 28 and the pawls 70 are fully withdrawn into the adapter spindle body 30 and are mainly within the guide roller 40. At this time the ribs 21 of cap 17 still abut the shoulders 55 of record supporting fingers 50 and maintain the nibs 57 in a radially extended position so as to support the stack of records R. The height of side wall 41 of roller 40 is greater than the height of the stack of records which will be played on the turntable. Consequently, when the pawls 70 subsequently are raised and are urged radially outwardly of slots 34 in body 30, they will not engage the edges of the center holes of the records which have already been lowered.

In the position of parts illustrated in FIGURE 6 the record-lowering assembly has been moved upwardly by reason of the primary fingers 26 and particularly the upper supporting surfaces 27 thereof lifting against the washer 65 which is positioned in the upper notches 62 of hangers 60. The supporting shoulders 75 of pawls 70 have moved radially outwardly of slots 34 under the bias of the spring 80 against the hooks 72 of the pawls 70. As shown in the copending application of G. H. Freier, Ser. No. 453,164 upward movement of the primary fingers 26 to a position adjacent the lowermost record of the stack of records is then accompanied by upward movement of the cap 17. Such movement raises the outwardly distended fingers 19 of cap 17 above the tapered surface 16 of spindle body 22 so that fingers 19 move radially inwardly. Simultaneously spring 53 urges fingers 50 radially inwardly and the raising of cap 17 causes the washer 54 above it, which seats in notches 52 of fingers 50, to further urge the fingers to pivot radially inwardly of housing 30 and out of engagement with the lowermost record of the stack. At this time the surfaces 75 of pawls 70 engage the lower surface of the stack of records and support the stack.

It is advantageous to lower the records to the turntable in a controlled manner rather than to drop the same. The present invention is highly advantageous in this respect since it provides such action by a 45 r.p.m. record adapter spindle which is controlled by a record supporting and lowering small-diameter type record changer spindle. Thus, the 45 r.p.m. record lowering mechanism is controlled by the record lowering mechanism of the center spindle for records which have a smaller diameter center hole. In this way one turntable has the advantage of automatically lowering and playing records having either small or large diameter center holes.

As hereinbefore discussed, the guide roller 40 rests on and rotates with the turntable 28 when the record adapter spindle 10 is mounted on the record lowering mechanism of the smaller diameter center spindle 12. When manually removing the record adapter spindle 10 from such mounted engagement, the guide roller 40 is removed along with the body 30 because a portion of the upper surface of the annular lower retainer 36 on body 30 abuts the overlapping portion of the lower surface of the annular bearing retainer 43 which is secured to the roller 40.

The adapter spindle 10 is not prevented from being lifted from center spindle 12 because of radially extending primary fingers 26 since both the lower washer 65 of the record lowering assembly and the central bearing portion 41*b* of the roller 40 cam the fingers 26 radially inwardly into spindle 12. When the record adapter spindle is removed from the small diameter spindle the assembled record support fingers 50 and the record-lowering assembly (hangers 60, pawls 70, etc.) are free to move longitudinally within their slots axially of the record adapter spindle 10. The washers 65 limit the inward radial movement of the record support fingers 50.

When the record adapter spindle 10 is not associated with the small diameter spindle 12, the record-lowering assembly by its weight moves relatively downward in body 30 and the washer 65, positioned in the lower notches 63 of the hangers 60, abuts and rests on a shoulder portion 44 of the central guide portion 41*b* of the guide roller 40 and the lower ends of legs 58 of fingers 50 rest on the lower retainer washer 36. When the adapter spindle 10 is placed over the center spindle 12, the internal cone portion 42 of the roller 40 serves to cam the primary fingers 26 inwardly of spindle 12 to permit assembly of the record adapter spindle 10 on and about the small diameter spindle 12. The compressed primary fingers 26 thereafter re-extend between the two washers 65 which are positioned in the upper notches 62 and the lower notches 63 of hangers 60. When the fingers 26 are thus expanded the upper supporting surfaces 27 thereof support the spacer 65 and associated parts as hereinbefore described.

In summation, the present invention provides a 45 r.p.m. adapter which is self-supporting and provides controlled lowering of the records one at a time from an upper storage portion of the record adapter spindle 10 substantially the entire distance to the turntable. The adapter sets over and rests upon a self-supporting, controlled lowering, center spindle for records having a smaller diameter center hole. The adapter is free of the turntable with only the guide roller thereof resting on the table; which guide roller is free to rotate with the rotation of the turntable and is guided only by the center spindle to keep the records concentrically positioned on the turntable. Record lowering fingers of the adapter spindle lower the records one at a time to stack them on the turntable by the controlled lowering of the primary fingers 26 of the center spindle 12. The present invention thus provides a bearingless, quiet adapter formed of inexpensive parts, which adapter is easily attached to and disassembled from the small diameter center spindle.

Although I have described my invention with respect to certain specific embodiments thereof, I do not wish to be limited thereby, as various modifications of my invention are intended to be encompassed within its true spirit.

I claim:

1. A record adapter spindle for a record player having a center spindle which has means for releasing the lowermost record of a stack of small centerhole records toward the turntable and movable means, above said means for releasing for supporting and balancing at the upper end of said center spindle and above a turntable the remaining stack of small center hole records, said record adapter spindle comprising an adapter spindle body adapted to fit about and be centered by said center spindle, said body having adapter means for releasing the lowermost record of a stack of large center hole records toward the turntable and adapter support means, above said adapter means for releasing which is movable in response to movement of said movable support means of the center spindle to one position to support on said adapter spindle the remaining stack of large center hole records to be played, and said movable adapter support means being movable to a second position not supporting said stack of large center hole records.

2. The record adapter spindle of claim 1 wherein the adapter releasing means comprises means for lowering the lowermost record of the stack of large center hole records toward the turntable and the center spindle releasing means comprises means for lowering the lowermost record of the stack of small center hole records toward the turntable.

3. The record adapter spindle of claim 2 wherein said means for lowering of said center spindle in movable, and wherein the adapter means for lowering is movable in response to movement of said movable means for lowering of the center spindle.

4. The record adapter spindle of claim 2 wherein the adapter spindle body has a plurality of spaced vertical slots therein, and said movable adapter support means includes a plurality of record support fingers movably disposed within certain of the slots of the adapter spindle body, each record support finger being movable between said one position wherein at least a portion of it projects outwardly of the adapter spindle body and into engagement with a lower record of a supported stack of large center hole records, and said second position wherein it is out of contact with the record.

5. The record adapter spindle of claim 4 together with finger support means disposed within the adapter spindle body with the record support fingers being pivotally associated with said finger support means.

6. The record adapter spindle of claim 5 wherein the engaging portion of each of the record support fingers is a nib provided at an edge of the finger, which nib is adapted to engage supportingly the under surface of a lower record of the stack when the support finger is in its said one position.

7. The record adapter spindle of claim 3 wherein the adapter spindle body has a plurality of spaced vertical slots therein; said movable adapter means for lowering includes a plurality of hangers movably disposed within the spindle body, each hanger being movable between a raised position and a lowered position within the adapter spindle body; and a plurality of record lowering pawls each being pivotally attached to a separate hanger and movable between an extended position, wherein at least a portion of it projects outwardly of the adapter spindle body through one of said vertical slots, and a radially inward retracted position.

8. The record adapter spindle of claim 7 together with means in said adapter body for mounting said hangers and pawls for movement as an assembly axially of the body.

9. The adapter spindle of claim 2 wherein the adapter spindle body has a plurality of spaced vertical slots therein; and said movable adapter support means includes a plurality of record support fingers movably disposed within certain of the slots of the adapter spindle body, each record support finger being movable between said one position wherein at least a portion of it projects outwardly of the adapter spindle body and into engagement with a lower record of the supported stack of large center hole records, and said second position wherein it is out of contact with said record; said movable adapter means for lowering includes a plurality of hangers movably disposed within the spindle body, each hanger being movable between a raised position and a lowered position within the adapter spindle body; and a plurality of record lowering pawls each being pivotally attached to a hanger and movable between an extended position, wherein at least a portion of it projects outwardly of the adapter spindle body through one of the other of said slots, and a radially inward retracted position.

10. The record adapter spindle of claim 9 together with finger spring means yieldingly urging the fingers inwardly toward their retracted positions, and pawl spring means yieldably urging said pawls outwardly toward their extended positions.

11. The record adapter spindle of claim 1 together with a roller connected with said adapter spindle body at the lower end of said body and adapted to center the large center hole records on the turntable.

12. The record adapter spindle of claim 11 wherein the roller has a central bearing by which it is adapted to be centered on the turntable by said center spindle and be freely rotatable relative to said center spindle.

13. In a record adapter spindle of the type which supports a plurality of records at an upper storage portion of the adapter spindle and releases one record at a time to a turntable for playing and is adapted to be operated by a self-supporting center spindle having vertically movable primary record supporting means and radially expandable and contractable secondary record supporting means, the improvement comprising in combination: an adapter spindle body having a central passageway and a plurality of spaced vertical slots which extend downwardly from said upper storage portion of the adapter spindle body; a guide roller rotatably mounted to the adapter spindle body axially therebelow and having guide means for disposing it concentrically about the self-supporting center spindle, said roller having an upstanding peripheral wall; a plurality of record support fingers disposed within certain of the vertical slots of the adapter spindle body and movable between an extended position wherein they project outwardly of the adapter spindle body through certain of the slots into engagement with a lower record of the supported stack of large center hole records and a retracted position wherein they are out of engagement with the record; a plurality of hangers having extended and retracted positions and having notches, said hangers being disposed within certain other vertical slots of the adapter spindle body, each hanger being movable between a raised position within the adapter spindle body and a lowered position within the adapter spindle body and the guide roller; a plurality of record lowering pawls, one pivotally attached to each hanger, the pawls being pivotally movable between an extended position where they project outwardly of the adapter spindle body through said other vertical slots where they are adapted to engage the under side of the lowermost record of a stack of large center hole records and a retracted position where they are contained within the adapter spindle body and the guide roller where they cannot engage a record; a finger support washer disposed within the adapter spindle body so as to be above the center spindle when the adapter is mounted on the spindle, the record support fingers being mounted pivotally on the finger support washer; finger spring means yieldingly urging the fingers inwardly toward their retracted positions; each of the record support fingers having an outer edge and further being provided at said outer edge with a nib for engaging supportably the under surface of a lower record of a stack, which is positioned thereabove, when the support finger is in its extended position, each of the record support fingers also being provided with an inwardly disposed shoulder, with the shoulders being adjacent the secondary record supporting means when the adapter is mounted on the center spindle, so that when the secondary supporting means radially expands, the record support fingers move pivotally outwardly and the nibs thereof extend outwardly of the adapter spindle body; said hangers having mounting means including a plurality of spaced-apart, apertured washers disposed within the adapter spindle body and positioned concentrically about the center spindle when the adapter is mounted on the center spindle and seating in said notches in the hangers; and hanger spring means biasing the hangers into engagement with said washers; and pawl spring means yieldably biasing said pawls outwardly toward their extended positions; an upper one of the washers being supported by the vertically movable primary record supporting means when the adapter is mounted on the center spindle, whereby the downward movement of said primary record supporting means permits the hangers and attached pawls to be lowered, with the pawls serving to lower the lowermost record from the upper storage portion of the adapter spindle approximately the entire distance to the turntable, each pawl being provided with a cam portion which upon engagement with the upstanding peripheral wall of the guide roller cams the pawl to its retracted position so that the pawl disengages from the undersurface of the record and the record descends to the turntable.

14. A record adapter spindle for a record player having a center spindle for supporting a stack of small center hole records, which center spindle has means yieldingly urged laterally of said spindle for supporting and lowering the lowermost record of the stack toward the turntable, said record adapter spindle comprising an adapter spindle body, a roller connected with said adapter spindle at the lower end of said body, apertured central guide means on said roller for fitting about and guideing the roller for rotation about said center spindle at a level below said means yieldingly urged laterally, said central guide means including means for camming out of the way said means yieldingly urged laterally of the center spindle when said adapter spindle is placed about or removed from said center spindle.

References Cited

UNITED STATES PATENTS

| | | | |
|---|---|---|---|
| 2,893,739 | 7/1959 | Maxim | 274—10 |
| 3,071,380 | 1/1963 | Di Sabatino | 274—10 |
| 3,191,943 | 6/1965 | Reed | 274—10 |
| 3,279,797 | 10/1966 | Goulding | 274—10 |
| 3,352,561 | 11/1967 | Arent | 274—10 |

FOREIGN PATENTS

| | | |
|---|---|---|
| 1,207,655 | 12/1965 | Germany. |

LEONARD FORMAN, *Primary Examiner.*

J. M. FREED, *Assistant Examiner.*